July 12, 1938.  G. MAFERA  2,123,484
ALIGNER
Filed July 15, 1937
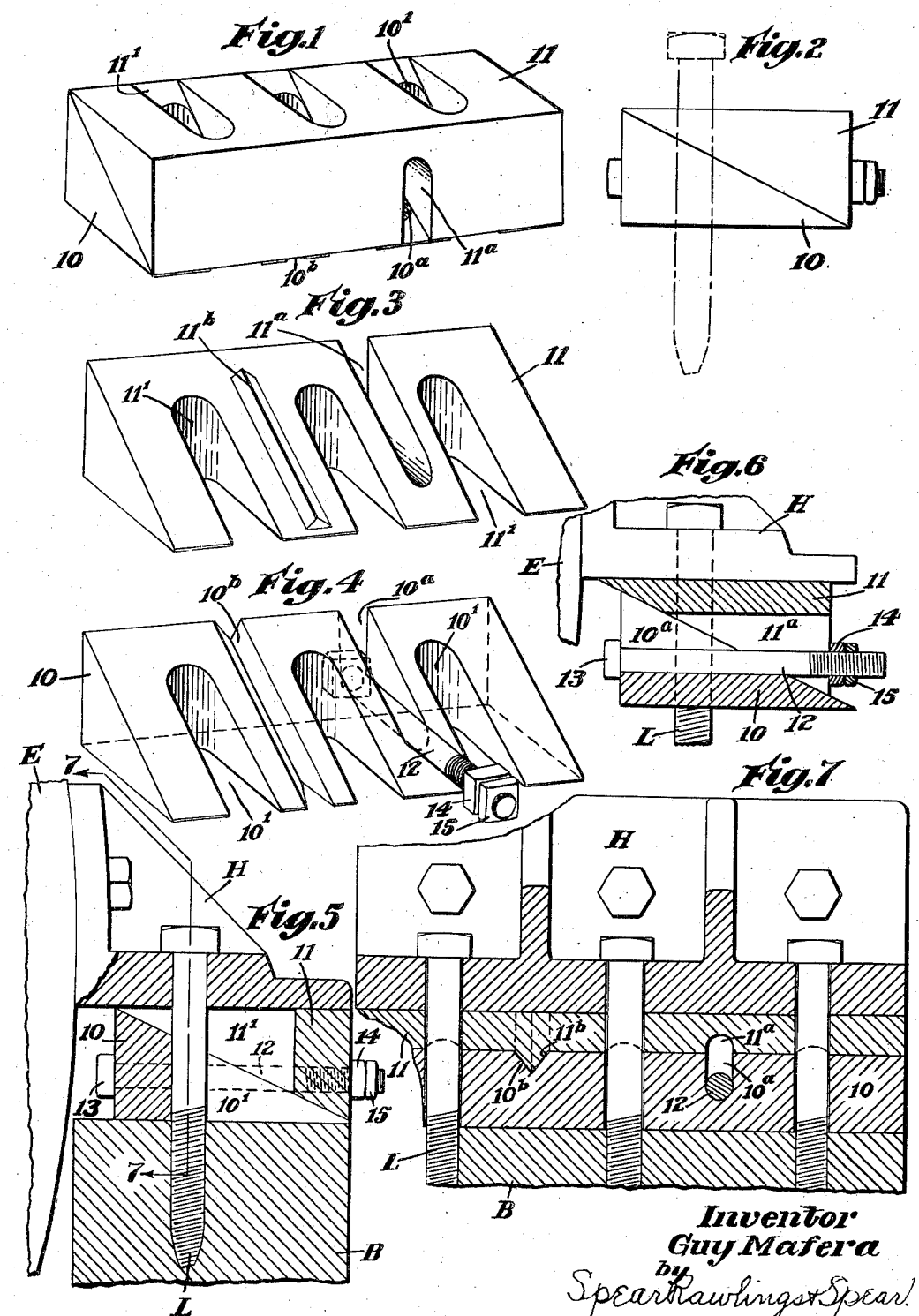
Inventor
Guy Mafera
by
Spear Rawlings & Spear
Attorneys Patented July 12, 1938

2,123,484

UNITED STATES PATENT OFFICE 2,123,484

ALIGNER

Guy Mafera, Revere, Mass.

Application July 15, 1937, Serial No. 153,767

1 Claim. (Cl. 254—104)

This invention relates to aligners for adjusting a machine element relative to its supporting base. Although not limited to such use, my aligner is especially adapted for aligning a marine engine with respect to its propeller shaft, and for the purposes of this application I shall so describe and illustrate it.

In general, the object of my invention is to provide a simple, inexpensive and reliable device for accurately and easily aligning the engine and propeller shafts of a marine engine, or for aligning or adjusting any other machine element relative to its supporting base.

I accomplish this object by the aligner illustrated in the accompanying drawing, wherein Fig. 1 is a perspective view of one embodiment of my invention ready for use.

Fig. 2 is an elevation thereof.

Figs. 3 and 4 are perspective views of the complemental wedge members of my aligners, separated.

Fig. 5 is a fragmentary view, partly in section, showing one of my aligners applied between the hanger bracket and base of a marine engine of conventional type.

Fig. 6 is a view similar to Fig. 5 but showing an adjusted position of the aligner, and Fig. 7 is a section on the line 7—7 of Fig. 5.

My aligner comprises essentially a pair of adjustable wedges adapted to be reversed and assembled on one another with their inclined faces in contact. When so assembled and interposed between a machine element and its supporting base, upon adjustment of one wedge relative to the other the machine element is correspondingly adjusted relative to its base.

The wedges are provided with one or more vertically disposed elongated registering slots for the reception of one or more of the usual lag screws by means of which the machine element is fastened to its base.

The wedges are further provided with longitudinally extending registering grooves, for the reception of an adjusting and tensioning member by means of which one wedge is adjusted longitudinally with respect to the other, such adjustment being permitted and held by the lag screw or screws and slots therefor.

I have indicated at 10 and 11 a pair of complemental wedges. The inclined faces of these wedges are vertically slotted as at 10′, 11′ and longitudinally grooved as at 10a, 11a.

Although each wedge need have only one slot, present-day marine engine hanger brackets H usually have three lag screws L, and accordingly I have shown my aligner as provided with three slots 10′ or 11′ for the reception of such lag screws.

The slots 10′, 11′ extend through the wedges from top to bottom. They are elongated, beginning at the thin end of the wedge and extending back towards but terminating short of the thick end of the wedge.

The longitudinal grooves 10a, 11a begin at the thick end of each wedge and extends towards but terminate short of the thin end of the wedge.

When the wedges are reversed and placed one upon the other with their inclined faces in mutual contact and bearing, the slots register with each other to provide an elongated opening extending continuously through the device from top to bottom for the reception of a lag screw. The grooves likewise register with each other to provide an opening extending through the device continuously from end to end thereof for the reception of an adjusting member 12.

The member 12 may take the form of a simple bolt, the head 13 of which abuts the thick end of the lower wedge and the nut 14 of which abuts the thick end of the upper wedge. Thus the bolt extends from end to end of the wedges between the inclined faces thereof, lying in the channel provided by the registering grooves 10a and 11a.

By rotating the bolt in one direction, the upper wedge is moved longitudinally along the lower wedge, this movement being permitted by the elongated registering slots 10′ and 11′ and being held by tightening the lag screw or screws L therein. If desired, the nut 14 may be provided with a lock nut or its equivalent 15 to prevent the same from working loose.

Also, if desired, the inclined faces of the wedges may be provided respectively with one or more mating tongues 11b and grooves 10b or their equivalents for the purpose of preventing unwanted lateral displacement of the wedges.

In use, with a marine engine, four of my aligners are placed beneath the four hanger brackets H of the engine E between the same and the engine base B. By adjusting one or more of the aligners as required the engine shaft may be quickly and easily alined with the propeller shaft.

While I have illustrated my device as an aligner for a marine engine, it is to be understood that such use is illustrative only and in no way limiting.

Similarly, while I have shown an embodiment of my invention which I prefer because found highly satisfactory under actual service conditions, I recognize that various changes in design and arrangement may be made therein as required by circumstances peculiar to its use in any particular purpose, and I therefore regard all such variations as within the scope of my invention, if within the limits of the appended claim.

What I therefore claim and desire to secure by Letters Patent is:—

An aligner for adjusting a machine element relative to its supporting base, comprising a pair of wedges adapted to be reversed and assembled one upon the other with their inclined faces disposed in mutual contact, the inclined face of each wedge having a longitudinal slot therethrough from top to bottom beginning at the thin end of the wedge and extending towards but terminating short of the thick end of the wedge and said slots registering with each other when the wedges are assembled one upon another to provide an elongated opening through the aligner continuously from top to bottom, the inclined face of each wedge further having a longitudinal groove beginning at the thick end of the wedge and extending towards but terminating short of the thin end of the wedge and said grooves registering with each other when the wedges are assembled one upon another to provide a channel extending through the aligner continuously from end to end thereof, an adjusting and tensioning member disposed within said channel through the inclined faces of said wedges and having a head and nut respectively coacting directly with the thick end of said wedges for effecting longitudinal adjustment of one of said wedges relative to the other on rotation of said member, and a second member disposed vertically through the registering slots of said wedges and connecting said wedges to the machine element and its supporting base and permitting and holding the longitudinal adjustment of said wedges.

GUY MAFERA.